United States Patent
Luh et al.

(10) Patent No.: US 9,590,519 B2
(45) Date of Patent: Mar. 7, 2017

(54) POWER ADAPTER WITH A STEP-DOWN TRANSFORMER AND A VOLTAGE STEP-UP CIRCUIT

(75) Inventors: Louis Luh, Sunnyvale, CA (US); Eric G. Smith, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/570,063

(22) Filed: Aug. 8, 2012

(65) Prior Publication Data
US 2014/0043862 A1    Feb. 13, 2014

(51) Int. Cl.
| H02M 7/5387 | (2007.01) |
| H02M 7/10 | (2006.01) |
| H02M 3/337 | (2006.01) |
| H02M 7/217 | (2006.01) |
| H02M 1/42 | (2007.01) |
| H02M 3/335 | (2006.01) |
| H02M 3/156 | (2006.01) |
| H02M 1/00 | (2006.01) |

(52) U.S. Cl.
CPC ......... *H02M 3/337* (2013.01); *H02M 1/4208* (2013.01); *H02M 7/10* (2013.01); *H02M 7/2176* (2013.01); *H02M 7/53871* (2013.01); *H02M 3/156* (2013.01); *H02M 3/335* (2013.01); *H02M 2001/007* (2013.01); *Y02B 70/126* (2013.01)

(58) Field of Classification Search
USPC ........ 323/205, 207, 266; 363/15, 16, 17, 98, 363/124, 126, 132
See application file for complete search history.

(56) References Cited

U.S. PATENT DOCUMENTS

| 6,219,264 | B1 * | 4/2001 | Drobnik | H02M 3/33592 363/127 |
| 7,254,048 | B2 * | 8/2007 | Lanni | 363/142 |
| 2009/0141519 | A1 * | 6/2009 | Hong et al. | 363/17 |
| 2009/0201707 | A1 * | 8/2009 | Park et al. | 363/126 |
| 2010/0142228 | A1 * | 6/2010 | Yamauchi et al. | 363/17 |
| 2010/0165668 | A1 * | 7/2010 | Lin | 363/21.02 |
| 2010/0259241 | A1 * | 10/2010 | Cuk | 323/311 |
| 2010/0265741 | A1 * | 10/2010 | Usui | 363/21.12 |

FOREIGN PATENT DOCUMENTS

EP    2110937 A1    10/2009

* cited by examiner

*Primary Examiner* — Jeffrey Gblende
(74) *Attorney, Agent, or Firm* — Blank Rome LLP

(57) ABSTRACT

Embodiments of an adapter are disclosed that include a rectifier with an input and an output coupled to a step-down transformer with a primary coil and a secondary coil, wherein the primary coil is coupled to the output of the rectifier. A step-up converter is coupled to the secondary coil.

23 Claims, 7 Drawing Sheets

POWER ADAPTER WITH A STEP-DOWN TRANSFORMER AND A VOLTAGE STEP-UP CIRCUIT

BACKGROUND

Field

The present embodiments relate to power adapters. More specifically, the present embodiments relate to stepping-up the voltage in a power adapter after the voltage is stepped-down using a transformer.

Related Art

Adapters that are designed to supply power to electronic devices such as laptop computers often include a power factor correction (PFC) circuit. Typically, the PFC circuit steps-up the input voltage to a voltage higher than the input voltage, and in order to safely handle this voltage, the PFC circuit must include one or more high-voltage components. These high-voltage components are often physically large and may take up a sizable portion of the adapter volume, which may interfere with other design considerations for the adapter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
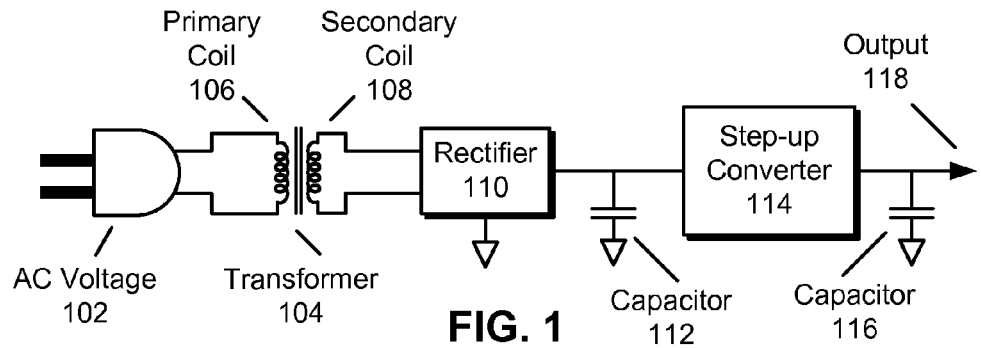
FIG. 1 shows an adapter in accordance with an embodiment.

FIG. 1 shows an adapter in accordance with an embodiment. Alternating current (AC) voltage 102 is coupled to transformer 104, which includes primary coil 106 and secondary coil 108. Secondary coil 108 is coupled through rectifier 110, across capacitor 112 through step-up converter 114 and across capacitor 116 to output 118.

AC voltage 102 is any device that outputs an AC voltage and may include but is not limited to a wall plug that can be plugged into an AC voltage outlet. For example, AC voltage 102 may be a standard wall plug that is plugged into an electrical outlet, and may be in any standard available in any country. In some embodiments, AC voltage 102 also includes a line filter that filters the voltage from AC voltage 102.

Transformer 104 is any step-down transformer with a primary coil and a secondary coil that can receive AC voltage from AC voltage 102 and step-down the received voltage and may be implemented in any technology. The turns ratio between primary coil 106 and secondary coil 108 may be set to any value based on the input voltage to transformer 104 and the desired output voltage. For example, in some embodiments, for an expected input voltage of 90 to 120 volts from AC voltage 102 and a desired output voltage in the range of 20 to 30 volts, a turns ratio between primary coil 106 and secondary coil 108 may be chosen to be about 4:1, while for an expected input voltage of 220 to 240 volts from AC voltage 102 for the same desired output voltage range, the turns ratio may be chosen to be about 8:1. In other embodiments, a turns ratio in the range of 4:1 up to 8:1 may be used.

Rectifier 110 is a voltage rectifier that converts the positive and negative voltage output from secondary coil 108 into voltage that is going positive only. Rectifier 110 may include but is not limited to a full-bridge rectifier, a half-bridge rectifier, or any other rectifier that outputs only a positive-going voltage from an input that is positive and negative, and it may be implemented in any technology.

Capacitor 112 and capacitor 116 are each any suitable capacitor selected based on factors including but not limited to voltage, capacity and leakage requirements, and may be implemented in any technology. Step-up converter 114 can be any type of step-up converter that steps-up an input voltage to a higher output voltage and may include a step-up converter controller (not shown) that controls the step-up converter based on feedback including but not limited to the power demanded from the adapter (e.g., from output 118), the output voltage of step-up converter 114, and/or a power factor correction of the adapter. Step-up converter 114 may also include a bypass diode (not shown). In some embodiments, step-up converter 114 includes a boost converter.

Output 118 may be coupled to or configured to be coupled to any electronic device that uses direct current (DC) voltage to operate, including but not limited to a laptop computer, a tablet computer, a smartphone, and/or a battery charger.

The adapter of FIG. 1 operates as follows. AC voltage is output from AC voltage 102 to primary coil 106. The AC voltage input to primary coil 106 is stepped-down by transformer 104 to a lower voltage that is output across secondary coil 108. The AC voltage output across secondary coil 108 is then rectified in rectifier 110 and input into step-up converter 114 across capacitor 112. Step-up converter 114 then steps-up the voltage to a higher voltage for output across capacitor 116. In some embodiments, step-up converter 114 steps-up the voltage to a value lower than the input voltage from AC voltage 102.

In one embodiment, AC voltage 102 is a standard wall plug that plugs into a household electrical outlet and receives from 80 volts to 240 volts AC electricity at from 50 Hz to 60 Hz, transformer 104 has a turns ratio of 8:1, and step-up converter 114 is a boost converter that outputs 40 volts to capacitor 116 and output 118. Capacitor 116 is a capacitor with a 50 volt maximum voltage rating. Output 118 is a laptop computer charger plug that is configured to power and/or charge a laptop computer.

Figure 2:
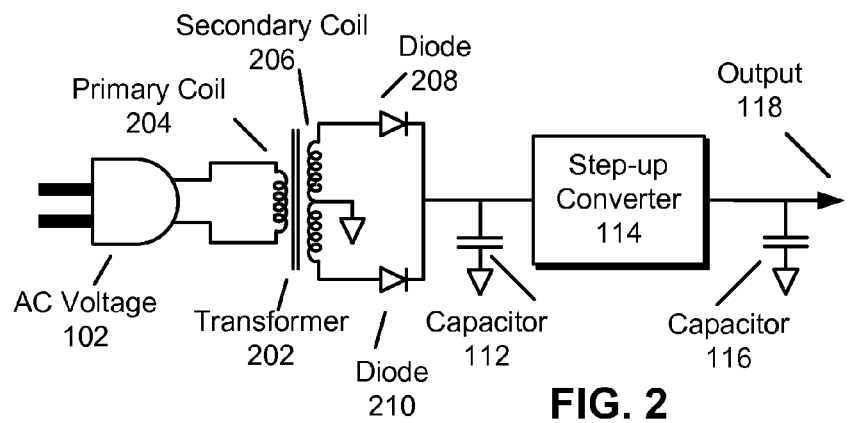
FIG. 2 shows an adapter including a center-tapped secondary coil in accordance with an embodiment.

FIG. 2 shows an adapter similar to the one depicted in FIG. 1, but with transformer 104 and rectifier 110 replaced by transformer 202, diode 208 and diode 210 in accordance with an embodiment. In FIG. 2, AC voltage 102 is coupled to transformer 202 through primary coil 204. Secondary coil 206 has a center tap coupled to ground, one end tap coupled to diode 208, and the other end tap coupled to diode 210. Diode 208 and diode 210 are coupled together and across capacitor 112 to step-up converter 114, and across capacitor 116 to output 118.

Transformer 202 is any step-down transformer with a primary coil and a center-tapped secondary coil that can receive AC voltage from AC voltage 102 and step-down the received voltage, and it may be implemented in any technology. The turns ratio between primary coil 204 and each arm of secondary coil 206 may be set to any value based on the input voltage to transformer 202 and the desired output voltage. For example, in some embodiments, for an expected input voltage of 90 to 120 volts from AC voltage 102 and a desired output voltage in the range of 20 to 30 volts, a turns ratio between primary coil 204 and each arm of secondary coil 206 may be chosen to be about 4:1, while for an expected input voltage of 220 to 240 volts from AC voltage 102 for the same desired output voltage range, the turns ratio may be chosen to be about 8:1. In other embodiments, a turns ratio of 4:1 up to 8:1 may be used.

Diode 208 and diode 210 can be any suitable diodes implemented in any technology and may be implemented using any combination of discrete or integrated technology.

The adapter of FIG. 2 operates as follows. AC voltage is output from AC voltage 102 to primary coil 204. On one-half of a cycle of the AC voltage applied to primary coil 204 (e.g., positive voltage from top to bottom of primary coil 204), the AC voltage is stepped-down and rectified in one arm of secondary coil 206 (e.g., between the center tap and diode 208), while in the other half-cycle of the AC voltage (e.g., negative voltage from top to bottom of primary coil 204), the AC voltage is stepped-down and rectified in the other arm of secondary coil 206 (e.g., between the center tap and diode 210).

The rectified voltage output from secondary coil 206 through diode 208 and diode 210 is then sent to step-up converter 114 across capacitor 112. Then, as described above with reference to FIG. 1, step-up converter 114 steps-up the voltage to a higher voltage for output across capacitor 116.

Figure 3:
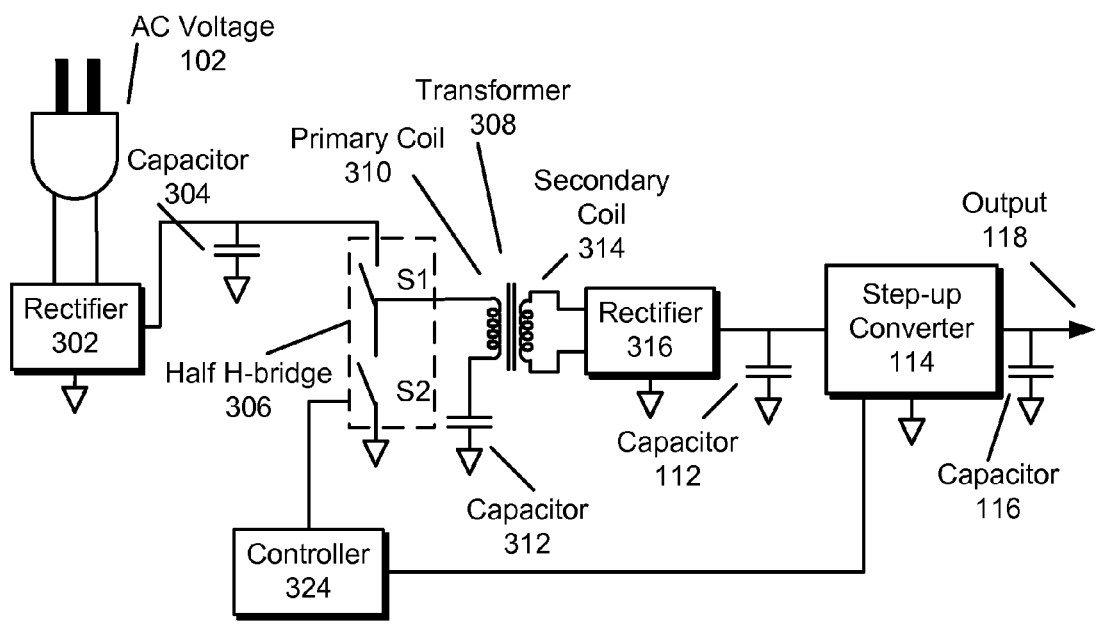
FIG. 3 shows an adapter including a half H-bridge in accordance with an embodiment.

FIG. 3 shows an adapter including a half H-bridge in accordance with an embodiment. AC voltage 102 is coupled through rectifier 302, across capacitor 304 and to the input of half H-bridge 306. The output of half H-bridge 306 is coupled to primary coil 310 of transformer 308 and then to capacitor 312. Secondary coil 314 is coupled to rectifier 316 which is coupled across capacitor 112 through step-up converter 114, and across capacitor 116 to output 118. Controller 324 is coupled to and controls switches S1 and S2 in half H-bridge 306 and also is coupled to and controls step-up converter 114. In some embodiments, controller 324 may also receive input from the output of rectifier 302 across capacitor 304, the output of rectifier 316 across capacitor 112, and/or from output 118.

Rectifier 302 is a voltage rectifier that converts the positive and negative voltage output from AC voltage 102 into voltage that is positive only. Rectifier 302 may include but is not limited to a full-bridge rectifier, a half-bridge rectifier, or any other rectifier that outputs only a positive-going voltage from an input that is positive and negative, and it may be implemented in any technology.

Capacitor 304 may be implemented in any technology and may be selected to have a peak voltage capacity based on the input voltage from AC voltage 102, and its size may be selected based on factors including but not limited to the expected peak output power of the adapter.

Half H-bridge 306 is any half H-bridge that includes two individual switches S1 and S2, each of which is controlled by controller 324. Half H-bridge 306 uses switches S1 and S2 in combination with capacitor 312 to control the voltage across primary coil 310 in transformer 308. For example, when switch S1 is closed and switch S2 is open, the voltage from the top to the bottom of primary coil 310 is positive and capacitor 312 is charging; when switch S1 is open and switch S2 is closed, the voltage from the top to the bottom of primary coil 310 is negative and capacitor 312 is discharging. Note that switches S1 and S2 can each be any type of switch implemented in any technology that can switch in response to a control signal. For example, switches S1 and S2 may include but are not limited to relays, or transistors such as FETs, including MOSFET transistors, and may be implemented using any combination of discrete and integrated components, and analog and/or digital technology. Note that capacitor 312 may be any capacitor selected based on factors including but not limited to the peak voltage from AC voltage 102, the switching frequency of half H-bridge 306 and/or the output power of the adapter.

Transformer 308 is any step-down transformer with a primary coil and a secondary coil that can receive a switched voltage wave from half H-bridge 306 at the required frequency, voltage and power, and step-down the received voltage, and it may be implemented in any technology. The turns ratio between primary coil 310 and secondary coil 314 may be set to any value based on the input voltage to transformer 308 and the desired output voltage. In some embodiments, the turns ratio between primary coil 310 and secondary coil 314 may be 4:1, 8:1 or anywhere in the range from 4:1 and 8:1.

Rectifier 316 is a voltage rectifier that converts the positive and negative voltage output from secondary coil 314 into voltage that is positive only. Rectifier 316 may include but is not limited to a full-bridge rectifier, a half-bridge rectifier, or any other rectifier that outputs only a positive-going voltage from an input that is positive and negative, and it may be implemented in any technology.

Controller 324 is a controller implemented in any combination of hardware and/or software and in any technology, and may include any combination of integrated and discrete components and may be implemented in any hardware module or apparatus. Controller 324 controls each switch S1 and S2 in half H-bridge 306 and may receive input (not shown) from one or more of rectifier 302 across capacitor 304, rectifier 316 across capacitor 112 and/or output 118. Step-up converter 114 may be controlled by controller 324 or by a separate controller (not shown) to step up the input voltage to step-up converter 114 based on feedback including but not limited to the power demanded from the adapter (e.g., from output 118), the output voltage of step-up converter 114, and/or a power factor correction of the adapter. Note that any inputs and outputs to controller 324 from the secondary side of transformer 308 may include an isolation device or circuit (not shown) to electrically isolate the secondary side of transformer 308 from the primary side such as an opto-isolator.

The adapter in FIG. 3 operates as follow. AC voltage output from AC voltage 102 is rectified in rectifier 302 and input into half H-bridge 306 across capacitor 304. Controller 324 controls switches S1 and S2 to alternately open and close, resulting in an alternately positive and negative voltage across primary coil 310, as discussed below with respect to FIGS. 4A-C.

Figure 4A:
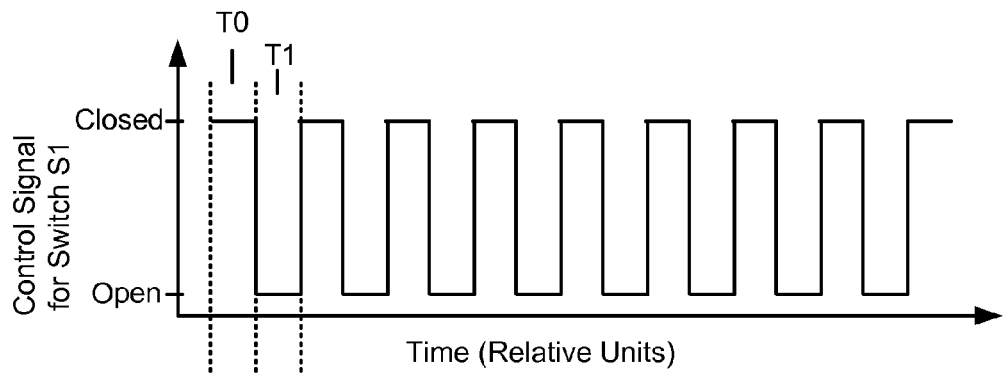
FIG. 4A depicts an exemplary graph of a control signal controlling a first switch in a half H-bridge coupled to the primary coil of a transformer in accordance with an embodiment.
Figure 4B:
FIG. 4B depicts an exemplary graph of a control signal controlling a second switch in a half H-bridge coupled to the primary coil of a transformer in accordance with an embodiment.
Figure 4C:
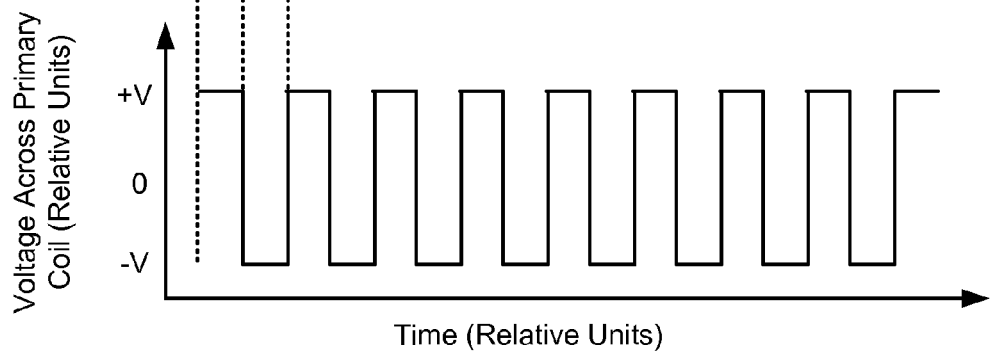
FIG. 4C depicts an exemplary graph of the voltage across the primary coil of an adapter transformer in accordance with an embodiment.

FIGS. 4A and 4B depict exemplary graphs of control signals from controller 324 controlling, respectively, switch S1 and switch S2 in half H-bridge 306 in accordance with an embodiment. FIG. 4C depicts an exemplary graph of the voltage across primary coil 310 as a result of the switching signals depicted in FIGS. 4A and 4B.

During time period T0, controller 324 controls switch S1 to close and S2 to open so that the voltage across primary coil 310 is positive (i.e., from top to bottom) and capacitor 312 charges up. In time period T1, controller 324 controls switch S1 to open and switch S2 to close so that the voltage across primary coil 310 is negative as capacitor 312 discharges. As depicted in FIGS. 4A-C, time periods T0 and T1 repeat, as controller 324 controls switches S1 and S2. Note that controller 324 may control the duration of time periods T0 and T1 so that the frequency of the voltage-switching cycle is any desired frequency, and may include, but is not limited to frequencies from 10 kHz to 1 MHz.

The voltage from primary coil 310 is stepped-down across secondary coil 314, rectified in rectifier 316 and output across capacitor 112 to step-up converter 114. In some embodiments, controller 324 controls step-up converter 114 to continuously step-up the voltage from the input of step-up converter 114, while in other embodiments, controller 324 controls step-up converter 114 to step-up the voltage input from rectifier 316 when the power demand from the adapter in FIG. 3 exceeds a predetermined level or when the output voltage demanded at output 118 exceeds the voltage output from rectifier 316.

Figure 5:
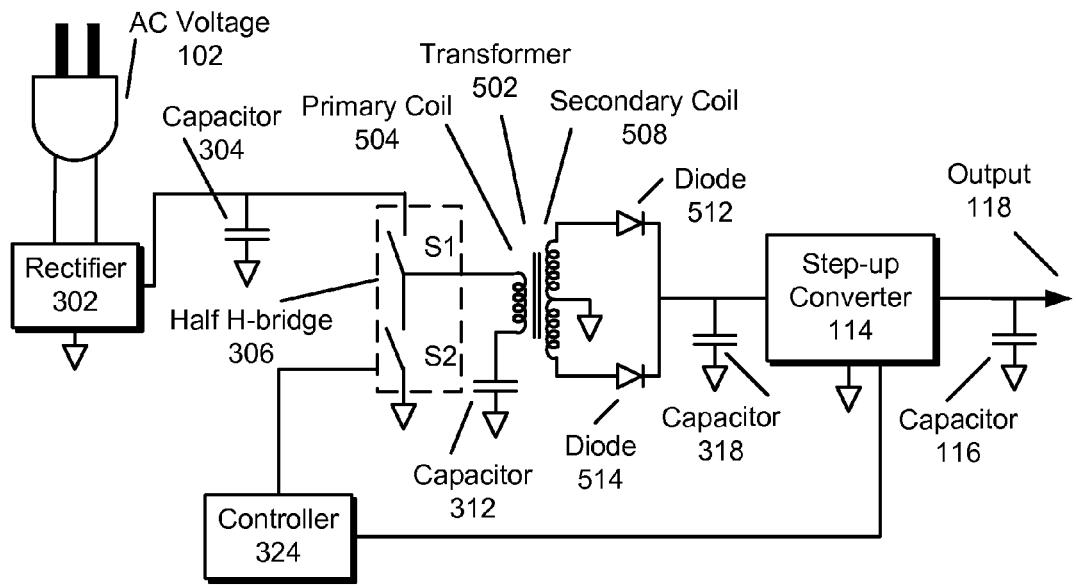
FIG. 5 shows an adapter including a half H-bridge and a center-tapped secondary coil in accordance with an embodiment.

FIG. 5 shows an adapter including a half H-bridge and a center-tapped secondary coil in accordance with an embodiment. AC voltage 102 is coupled through rectifier 302, across capacitor 304 and to the input of half H-bridge 306. The output of half H-bridge 306 is coupled to primary coil 504 of transformer 502 and then to capacitor 312. Secondary coil 508 has a center tap coupled to ground, and one end tap is coupled to diode 512 and the other end tap is coupled to diode 514. Diode 512 and diode 514 are coupled together and across capacitor 318 to step-up converter 114, and across capacitor 116 to output 118. Controller 324 is coupled to and controls switches S1 and S2 in half H-bridge 306 and also is coupled to and controls step-up converter 114. In some embodiments, controller 324 may also receive input from the output of rectifier 302 across capacitor 304, the output of diode 512 and diode 514 across capacitor 318, and/or from output 118.

Transformer 502 is any step-down transformer with a primary coil and a center-tapped secondary coil that can receive a switched voltage signal from half H-bridge 306 and step-down the received voltage, and it may be implemented in any technology. The turns ratio between primary coil 504 and each arm of secondary coil 508 may be set to any value based on the input voltage to transformer 502 and the desired output voltage. The turns ratio between primary coil 504 and secondary coil 508 may be set to any value based on the input voltage to transformer 502 and the desired output voltage. In some embodiments, the turns ratio between primary coil 504 and each arm of secondary coil 508 may be 4:1, 8:1 or anywhere in the range from 4:1 and 8:1.

Diode 512 and diode 514 can be any suitable diodes implemented in any technology and may be implemented using any combination of discrete or integrated technology.

The embodiment of FIG. 5 operates similarly to that of FIG. 3, except that the voltage induced in secondary coil 508 between the center tap and diode 512 and diode 514 on each half cycle of the voltage across primary coil 504 is rectified in the same manner as described with respect to transformer 202 of FIG. 2.

Figure 6:
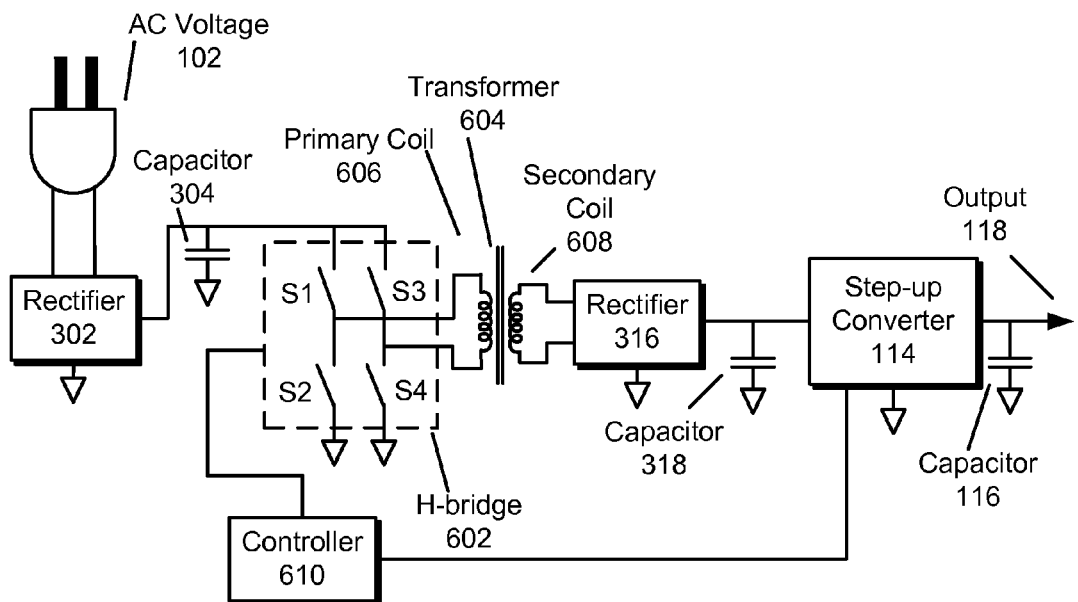
FIG. 6 shows an adapter including an H-bridge in accordance with an embodiment.

FIG. 6 shows an adapter including an H-bridge in accordance with an embodiment. AC voltage 102 is coupled through rectifier 302 across capacitor 304 to the input to H-bridge 602. The output of H-bridge 602 is coupled to primary coil 606 of transformer 604. Secondary coil 608 of transformer 604 is coupled to rectifier 316, across capacitor 318, through step-up converter 114 and to output 118 across capacitor 116. Controller 610 is coupled to and controls switches S1-S4 in H-bridge 602 and also is coupled to and controls step-up converter 114. In some embodiments, controller 610 may also receive input from the output of rectifier 302 across capacitor 304, the output of rectifier 316 across capacitor 318, and/or from output 118. Note that in some embodiments a separate controller may be used to control step-up converter 114.

H-bridge 602 is any H-bridge that includes four individual switches S1-S4, each of which is controlled by controller 610. H-bridge 602 uses switches S1 to S4 to control the voltage across primary coil 606 in transformer 604. For example, when switches S1 and S4 are closed and switches S2 and S3 are open, the voltage from the top to the bottom of primary coil 606 is positive; when switches S1 and S4 are open and switches S2 and S3 are closed, the voltage from the top to the bottom of primary coil 606 is negative. Note that switches S1 to S4 can each be any type of switch implemented in any technology that can switch in response to a control signal. For example, switches S1 to S4 may include but are not limited to relays, or transistors such as FETs, including MOSFET transistors, and may be implemented using any combination of discrete and integrated components, and analog and/or digital technology.

Transformer 604 is any step-down transformer with a primary coil and a secondary coil that can receive a switched voltage wave from H-bridge 602 at the required frequency, voltage and power, and step-down the received voltage, and it may be implemented in any technology. The turns ratio between primary coil 606 and secondary coil 608 may be set to any value based on the input voltage to transformer 604 and the desired output voltage. In some embodiments, the turns ratio between primary coil 606 and secondary coil 608 may be 4:1, 8:1 or anywhere in the range from 4:1 and 8:1.

Controller 610 is a controller implemented in any combination of hardware and/or software and in any technology, and may include any combination of integrated and discrete components and may be implemented in any hardware module or apparatus. Controller 610 controls each switch S1 to S4 in H-bridge 602 and may receive input (not shown) from one or more of rectifier 302 across capacitor 304, rectifier 316 across capacitor 318 and/or output 118. Step-up converter 114 may be controlled by controller 610 or by a separate controller (not shown) to step up the input voltage to step-up converter 114 based on feedback including but not limited to the power demanded from the adapter (e.g., from output 118), the output voltage of step-up converter 114, and/or a power factor correction of the adapter. Note that any inputs and outputs to controller 610 from the secondary side of transformer 604 may include an isolation device or circuit (not shown) to electrically isolate the secondary side of transformer 604 from the primary side such as an opto-isolator.

The adapter in FIG. 6 operates as follow. AC voltage output from AC voltage 102 is rectified in rectifier 302 and input into H-bridge 602 across capacitor 304. Controller 610 controls switches S1 and S4, and S2 and S3 to alternately open and close, resulting in an alternately positive and negative voltage across primary coil 606, as discussed below with respect to FIGS. 7A-D.

Figure 7A:
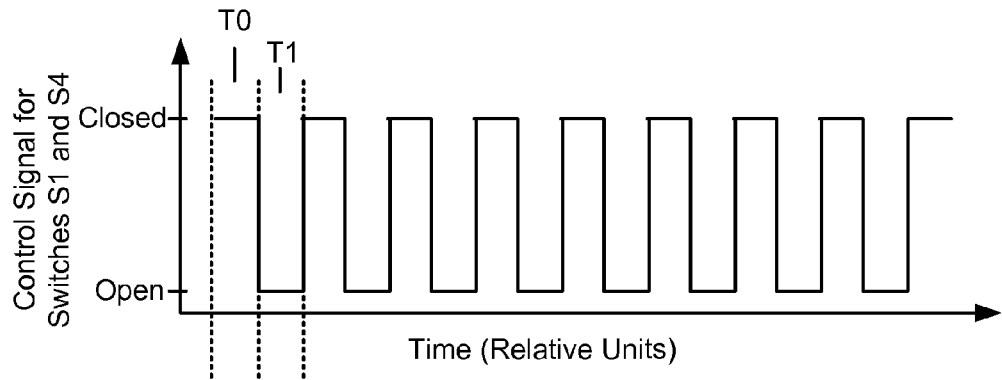
FIG. 7A depicts an exemplary graph of a control signal controlling two switches in an H-bridge coupled to the primary coil of a transformer in accordance with an embodiment.
Figure 7B:
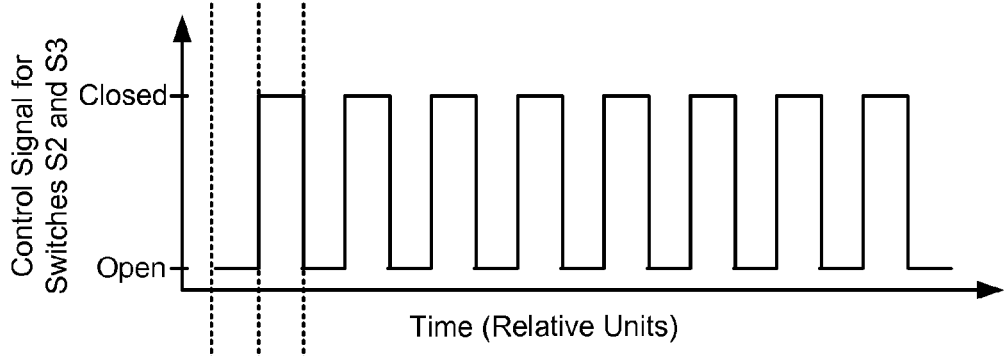
FIG. 7B depicts an exemplary graph of a control signal controlling two other switches in an H-bridge coupled to the primary coil of a transformer in accordance with an embodiment.
Figure 7C:
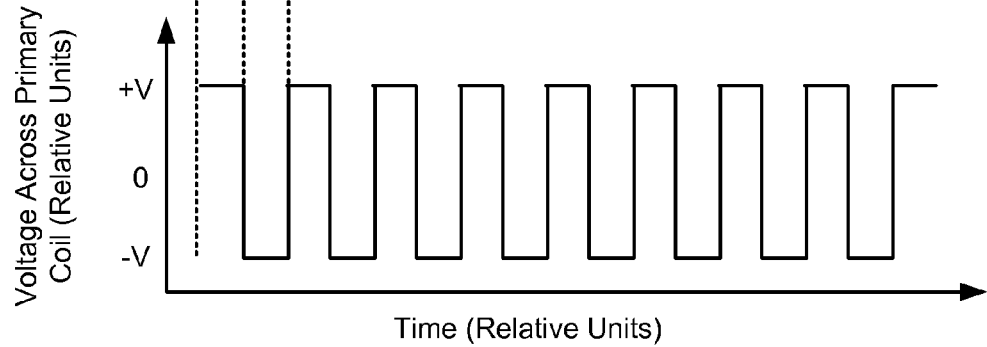
FIG. 7C depicts an exemplary graph of the voltage across the primary coil of an adapter transformer in accordance with an embodiment.

FIGS. 7A and 7B depict exemplary graphs of control signals from controller 610 controlling, respectively, switches S1 and S4, and switches S2 and S3 in H-bridge 602 in accordance with an embodiment. FIG. 7C depicts an exemplary graph of the voltage across primary coil 606 as a result of the switching signals depicted in FIGS. 7A and 7B.

During time period T0, controller 610 controls switches S1 and S4 to close and switches S2 and S3 to open so that the voltage across primary coil 606 is positive (i.e., from top to bottom). In time period T1, controller 610 controls switches S1 and S4 to open and switches S2 and S3 to close so that the voltage across primary coil 606 is negative. As depicted in FIGS. 7A-C, time periods T0 and T1 repeat, as controller 610 controls switches S1 to S4. Note that controller 610 may control the duration of time periods T0 and T1 so that the frequency of the voltage-switching cycle is any desired frequency, and may include, but is not limited to frequencies from 10 kHz to 1 MHz. Note that controller 610 may also control switches S1 and S4 and switches S2 and S3 as described in the U.S. patent application entitled "Controlling an Adapter Transformer Voltage," by Louis Luh, Eric Smith, and P. Jeffrey Ungar, Ser. No. 13/568,414 filed on 7 Aug. 2012, which is hereby fully incorporated by reference.

The voltage from primary coil 606 is stepped-down across secondary coil 608, rectified in rectifier 316 and output across capacitor 318 to step-up converter 114. In some embodiments, controller 610 controls step-up converter 114 to continuously step-up the voltage from the input of step-up converter 114, while in other embodiments, controller 610 controls step-up converter 114 to step-up the voltage input from rectifier 316 when the power demand from the adapter in FIG. 6 exceeds a predetermined level or when the output voltage demanded at output 118 exceeds the voltage output from rectifier 316.

Figure 8:
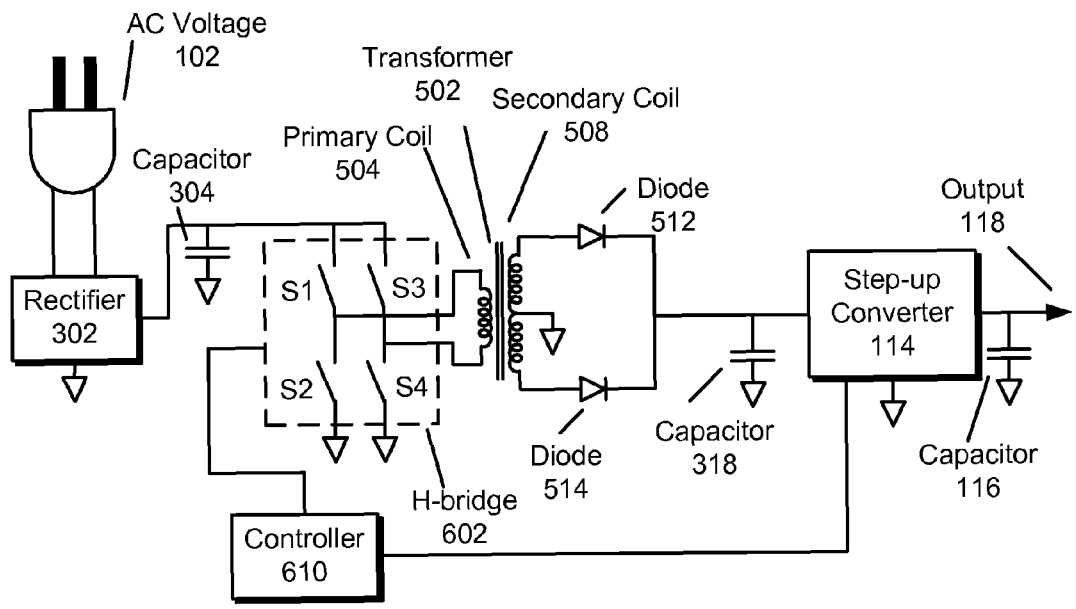
FIG. 8 shows an adapter including an H-bridge and a center-tapped secondary coil in accordance with an embodiment.

FIG. 8 shows an adapter similar to the one depicted in FIG. 6, but with transformer 604 and rectifier 316 replaced by transformer 502, diode 512 and diode 514 in accordance with an embodiment. AC voltage 102 is coupled through rectifier 302 across capacitor 304 to the input to H-bridge 602. The output of H-bridge 602 is coupled to primary coil 504 of transformer 502. Secondary coil 508 has a center tap coupled to ground, one end tap coupled to diode 512, and the other end tap coupled to diode 514. Diode 512 and diode 514 are coupled together and across capacitor 318 to step-up converter 114, and then across capacitor 116 to output 118. Controller 610 is coupled to and controls switches S1-S4 in H-bridge 602 and also is coupled to and controls step-up converter 114. In some embodiments, controller 610 may also receive input from the output of rectifier 302 across capacitor 304, the output of diode 512 and diode 514 across capacitor 318, and/or from output 118.

The embodiment of FIG. 8 operates similarly to that of FIG. 6, except that the voltage induced in secondary coil 508 between the center tap and diode 512 and diode 514 on each half cycle of the voltage across primary coil 504 is rectified in the same manner as described above with respect to transformer 202 of FIG. 2 rectifying the voltage from primary coil 204 using center-tapped secondary coil 206 and diode 208 and diode 210. Controller 610 controls switches S1 and S4, and switches S2 and S3 in H-bridge 602 as described above with reference to FIGS. 6 and 7.

Figure 9:
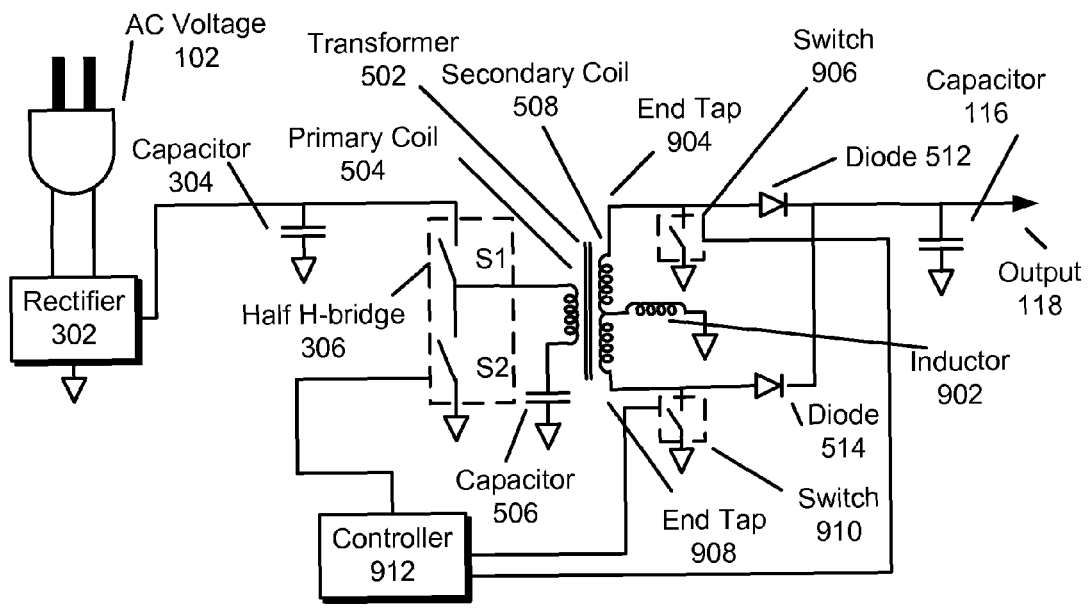
FIG. 9 shows an adapter including a half H-bridge and a center-tapped secondary coil with an inductor in accordance with an embodiment.

FIG. 9 shows an adapter with a half H-bridge and a center-tapped secondary coil with an inductor in accordance with an embodiment. AC voltage 102 is coupled through rectifier 302 across capacitor 304 to the input to half H-bridge 306. The output of half H-bridge 306 is coupled to primary coil 504 of transformer 502 and capacitor 506. Secondary coil 508 has a center tap coupled through inductor 902 to ground, and end tap 904 is coupled to diode 512 and end tap 908 is coupled to diode 514. Switch 906 is coupled from end tap 904 to ground, and switch 910 is coupled from end tap 908 to ground. Diode 512 and diode 514 are coupled together and across capacitor 116 to output 118. Controller 912 is coupled to and controls switches S1 and S2 in half H-bridge 306, and also switch 906 and switch 910. In some embodiments, controller 912 may also receive input from the output of rectifier 302 across capacitor 304, and/or from output 118.

Inductor 902 can be any type of inductor implemented in any technology. The inductance of inductor 902 can be selected based on parameters including the inductance of secondary coil 508. In some embodiments, the ratio between the inductance of each arm of secondary coil 508 and the inductance of inductor 902 is 5, 10 or in the range from 2 to 20. For example, in one embodiment, the inductance of one arm of secondary coil 508 is 100 microhenries and the inductance of inductor 902 is selected to be 10 microhenries.

Switch 906 and switch 910 can each be any type of switch implemented in any technology that can switch in response to a control signal. For example, switch 906 and/or switch 910 may include but are not limited to relays, or transistors such as FETs, including MOSFET transistors, and may be implemented using any combination of discrete and integrated components, and analog and/or digital technology. Controller 912 is similar to controller 324 and also includes control logic, programming and/or circuitry to control switch 906 and switch 910 as described below.

The embodiment of FIG. 9 operates similarly to the embodiment of FIG. 5. Controller 912 controls half H-bridge 306 in the same manner as controller 324. In addition, controller 912 may control switch 906 and switch 910 to boost the voltage from secondary coil 508 as depicted in FIGS. 10B and 10C discussed below.

Figure 10A:
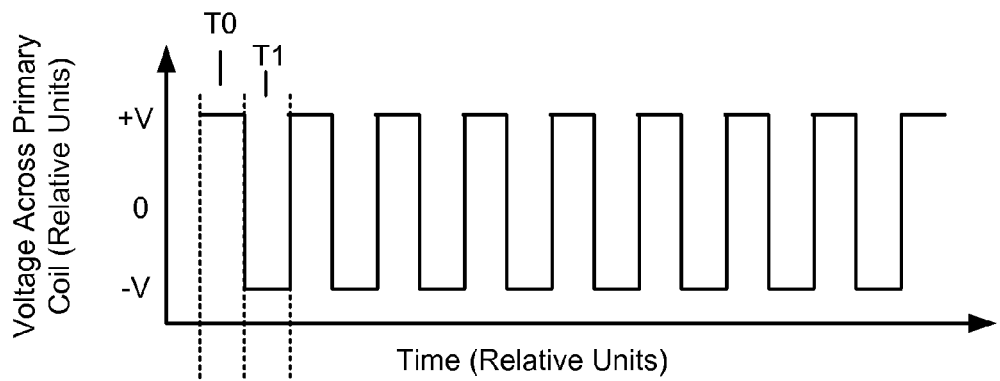
FIG. 10A depicts an exemplary graph of the voltage across the primary coil of an adapter transformer in accordance with an embodiment.
Figure 10B:
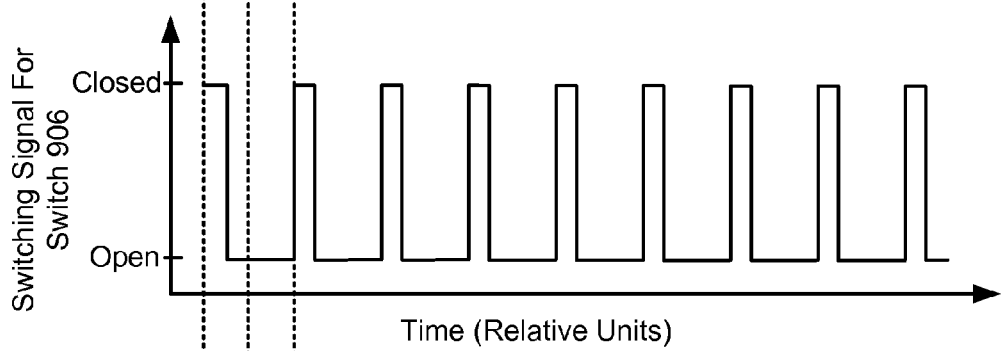
FIG. 10B depicts an exemplary graph of a control signal controlling switch 906 in accordance with an embodiment.
Figure 10C:
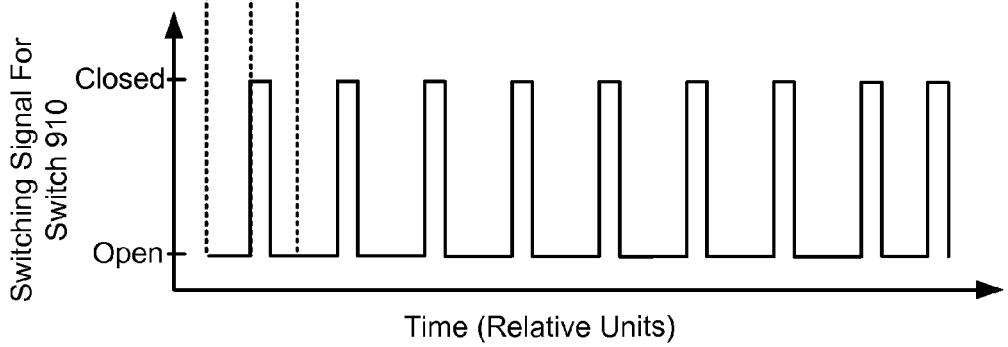
FIG. 10C depicts an exemplary graph of a control signal controlling switch 910 in accordance with an embodiment.

FIG. 10A depicts an exemplary graph of the voltage across the primary coil 504, and FIGS. 10B and 10C depict the relative timing of the control signals, respectively, for switch 906 and switch 910 from controller 912 to boost the voltage from secondary coil 508. As depicted in FIG. 10A, during time period T0 the voltage across primary coil 504 is positive. This induces a positive voltage in secondary coil 508 between the center tap and end tap 904. As depicted in FIG. 10B, controller 912 controls switch 906 to remain closed during the first portion of time period T0; then, during the second portion, controller 912 controls switch 906 to open, boosting the voltage from the top arm of secondary coil 508. Controller 912 may vary the portion of T0 during which switch 906 is open/closed in order to vary the magnitude of the voltage boost generated. Note that as depicted in FIG. 10C, controller 912 controls switch 910 to remain open during time period T0.

As depicted in FIG. 10C, during time period T1, controller 912 controls switch 910 in a similar fashion to boost the voltage when the voltage across primary coil 504 is negative and the induce voltage in secondary coil 508 is positive from the center tap to end tap 908 across the bottom arm of secondary coil 508. Controller 912 controls switch 910 to remain closed during the first portion of time period T1; then, during the second portion, controller 912 controls switch 910 to open, boosting the voltage from the bottom arm of secondary coil 508. Note that as depicted in FIG. 10B controller 912 controls switch 906 to remain open during time period T1. Controller 912 may vary the portion of T1 during which switch 910 is open/closed in order to vary the magnitude of the voltage boost generated.

Figure 11:
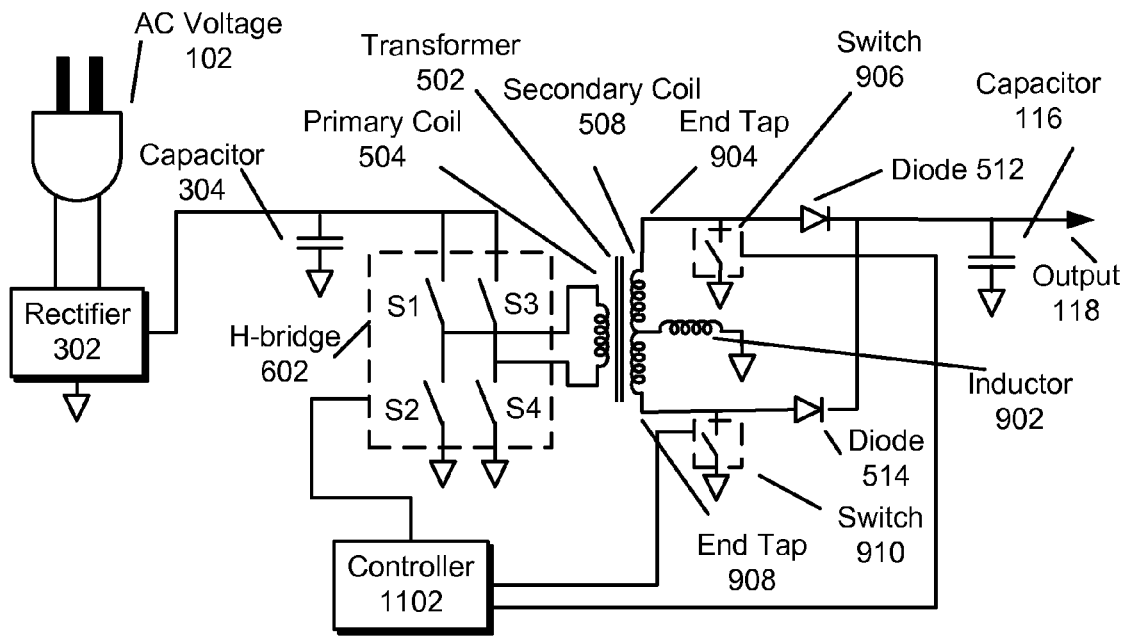
FIG. 11 shows an adapter including an H-bridge and a center-tapped secondary coil with an inductor in accordance with an embodiment.

Also note that if transformer 502 has the opposite polarity, then positive voltage is induced in the opposite arm of secondary coil 508 during time periods T0 and T1, and the switching signals for switch 906 are switch 910 are interchanged. Additionally, if controller 912 is not going to boost the voltage from transformer 502, then controller 912 controls switch 906 and switch 910 both to remain open FIG. 11 shows an adapter similar to the one depicted in FIG. 9, with half H-bridge 306 replaced by H-bridge 602 and controller 912 replaced by controller 1102. AC voltage 102 is coupled through rectifier 302 across capacitor 304 to the input to H-bridge 602. The output of H-bridge 602 is coupled to primary coil 504 of transformer 502. Secondary coil 508 has a center tap coupled through inductor 902 to ground, and end tap 904 is coupled to diode 512 and end tap 908 is coupled to diode 514. Switch 906 is coupled from end tap 904 to ground, and switch 910 is coupled from end tap 908 to ground. Diode 512 and diode 514 are coupled together and across capacitor 116 to output 118.

Controller 1102 is coupled to and controls switches S1 to S4 in H-bridge 602, and also switch 906 and switch 910. In some embodiments, controller 1102 may also receive input from the output of rectifier 302 across capacitor 304, and/or from output 118. Controller 1102 includes control logic, programming and/or circuitry to control H-bridge 602 in the same manner as controller 610 described above, and switch 906 and switch 910 in the same manner as controller 912 described above. The embodiment of FIG. 11 operates similarly to the embodiment of FIG. 9, except instead of controller 912 controlling the voltage across primary coil 504 using half H-bridge 306, the voltage across primary coil 504 is controlled by controller 1102 using H-bridge 602.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An adapter, comprising:
   a rectifier with an input and an output;
   a step-down transformer with a primary coil and a secondary coil, wherein the primary coil is coupled to the output of the rectifier, and wherein the secondary coil comprises a first end tap and a second end tap;
   a first switch and a second switch, each of the first switch and the second switch having a first switch end and a second switch end, wherein:
   the first switch end of the first switch is coupled to the first end tap and the second switch end of the first switch is coupled to ground, and
   the first switch end of the second switch is coupled to the second end tap and the second switch end of the second switch is coupled to ground; and
   a controller coupled to the first switch and the second switch;
   wherein the controller is configured to control a primary positive voltage and a primary negative voltage across the primary coil, wherein the primary positive and negative voltages cause a secondary positive voltage and a secondary negative voltage across the secondary coil; and
   wherein the controller is configured to alternate activating the first switch and the second switch by activating the first switch during the secondary positive voltage and activating the second switch during the secondary negative voltage based on the secondary positive and negative voltages across the secondary coil.

2. The adapter of claim 1, further including:
   a first diode with a first anode and a first cathode; and
   a second diode with a second anode and a second cathode, wherein the secondary coil includes a center tap coupled to a ground, and wherein the first end tap is coupled to the first anode, the second end tap is coupled to the second anode, and wherein the first cathode is coupled to the second cathode and to an output node.

3. The adapter of claim 2, further including:
   an H-bridge, with an input and an output, wherein the H-bridge input is coupled to the rectifier output and the H-bridge output is coupled to the primary coil.

4. The adapter of claim 2, wherein a turns ratio of the primary coil to the secondary coil is in the range from 4:1 to 8:1.

5. The adapter of claim 2, further including:
   a capacitor coupled to a first end of the primary coil; and a half H-bridge, with an input and an output, wherein the half H-bridge input is coupled to the rectifier output and the half H-bridge output is coupled to a second end of the primary coil.

6. The adapter of claim 2, wherein the controller is coupled to control inputs for the first switch and the second switch, wherein the controller is configured to control the voltage output on the output node using the first switch and the second switch.

7. The adapter of claim 1, further including:
a capacitor coupled to an output node of the adapter, wherein a maximum voltage rating of the capacitor is less than or equal to a maximum input voltage rating of the adapter.

8. The adapter of claim 1, further including:
a capacitor coupled to an output node of the adapter, wherein a maximum voltage rating of the capacitor is less than or equal to 50 volts.

9. An adapter, comprising:
a step-down transformer with a primary coil and a secondary coil, wherein the secondary coil includes a center tap coupled to a ground, and a first end tap and a second end tap;
a first diode with a first anode and a first cathode, wherein the first anode is coupled to the first end tap;
a second diode with a second anode and a second cathode, wherein the second anode is coupled to the second end tap, and the first cathode is coupled to the second cathode;
a first switch and a second switch, wherein each of the first switch and the second switch has a first switch end and a second switch end, wherein the first switch end of the first switch is coupled to the first end tap and the second switch end of the first switch is coupled to ground, and the first switch end of the second switch is coupled to the second end tap and the second switch end of the second switch is coupled to ground;
a controller coupled to the first switch and the second switch;
wherein the controller is configured to control a primary positive voltage and a primary negative voltage across the primary coil, wherein the primary positive and negative voltages cause a secondary positive voltage and a secondary negative voltage across the secondary coil; and
wherein the controller is configured to alternate activating the first switch and the second switch by activating the first switch during the secondary positive voltage and activating the second switch during the secondary negative voltage based on the secondary positive and negative voltages across the secondary coil.

10. The adapter of claim 9,
wherein the controller is coupled to control inputs for the first switch and the second switch,
wherein the controller is configured to alternately close the first switch for a portion of a first duration of the secondary positive voltage and open the first switch for a remaining portion of the first duration to control a voltage output on an output node of the adapter, and
wherein the controller is configured to alternately close the second switch for a portion of a second duration of the secondary negative voltage and open the second switch for a remaining portion of the second duration to control the voltage output on the output node of the adapter.

11. The adapter of claim 9, wherein a turns ratio of the primary coil to the secondary coil is in the range from 4:1 to 8:1.

12. The adapter of claim 9, further including:
a rectifier with an input and an output; and
an H-bridge with an input and an output, wherein the output of the rectifier is coupled to the input of the H-bridge and the output of the H-bridge is coupled to the primary coil.

13. The adapter of claim 9, further including:
a rectifier with an input and an output;
a capacitor coupled to a first end of the primary coil; and
a half H-bridge with an input and an output, wherein the output of the rectifier is coupled to the input of the half H-bridge and the output of the half H-bridge is coupled to a second end of the primary coil.

14. The adapter of claim 9, further including:
an output node coupled to the first cathode and the second cathode;
a capacitor coupled to the output node, wherein a maximum voltage rating of the capacitor is less than or equal to a maximum input voltage rating of the adapter.

15. The adapter of claim 9, further including:
an output node coupled to the first cathode and the second cathode;
a capacitor coupled to the output node, wherein a maximum voltage rating of the capacitor is less than 50 volts.

16. A method for generating an output voltage in an adapter, comprising:
receiving an alternating current voltage;
rectifying the alternating current voltage, thereby forming a rectified voltage;
applying the rectified voltage across a primary coil in a step-down transformer; and
controlling a primary positive voltage and a primary negative voltage across the primary coil, wherein the primary positive and negative voltages cause a secondary positive voltage and a secondary negative voltage across the secondary coil; and
controlling a voltage output on an output node of the adapter with a first switch, coupled between a first end tap of a secondary coil of the step-down transformer and ground, and a second switch, coupled between a second end tap of the step-down transformer and ground, and
alternately activating the first switch and the second switch by activating the first switch during the secondary positive voltage and activating the second switch during the secondary negative voltage based on the secondary positive and negative voltages across the secondary coil.

17. The method of claim 16, wherein voltage output on the output node of the adapter is less than or equal to 50 volts.

18. The method of claim 16, wherein a maximum voltage in the adapter is less than or equal to the alternating current voltage.

19. The method of claim 16, wherein controlling the voltage output on the output node of the adapter comprises controlling the voltage based on a power demand.

20. The method of claim 16, wherein applying a voltage across the primary coil includes switching a polarity of the voltage across the primary coil at a frequency of at least 50,000 Hz.

21. The adapter of claim 2, wherein activating the first switch comprises closing the first switch and connecting the first end tap to a second output of the adapter and wherein activating the second switch comprises closing the second switch and connecting the second end tap to the second output of the adapter.

22. The adapter of claim 9, wherein activating the first switch comprises closing the first switch and connecting the first end tap to a second output of the adapter and wherein activating the second switch comprises closing the second switch and connecting the second end tap to the second output of the adapter.

23. The method of claim 16, wherein activating the first switch comprises closing the first switch and connecting the first end tap to a second output of the adapter and wherein activating the second switch comprises closing the second switch and connecting the second end tap to the second output of the adapter.

* * * * *